Nov. 4, 1924.

F. D. MacDONALD

FLORAL SUPPORT

Filed April 1, 1924

1,513,841

Inventor:
Frederick D. MacDonald

Patented Nov. 4, 1924.

1,513,841

UNITED STATES PATENT OFFICE.

FREDERICK D. MacDONALD, OF MILWAUKEE, WISCONSIN.

FLORAL SUPPORT.

Application filed April 1, 1924. Serial No. 703,568.

*To all whom it may concern:*

Be it known that I, FREDERICK D. MACDONALD, a citizen of the United States, and resident of Milwaukee, in the county of Milwaukee and State of Wisconsin, have invented certain new and useful Improvements in Floral Supports; and I do hereby declare that the following is a full, clear, and exact description thereof.

This invention relates to improvements in floral supports and more particularly to a support adapted to be used in conjunction with a bowl for holding the stems of cut flowers in proper display arrangement.

The primary object of the invention is to provide a floral support with means for detachably and securely anchoring the same at any desired position within a bowl, containing water, when the same is used in connection with fresh cut flowers.

A more specific object resides in the provision of a floral support with a vacuum cup detachably secured to its bottom, whereby it does not detract from the appearance of the support, and may readily be removed or replaced.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1:
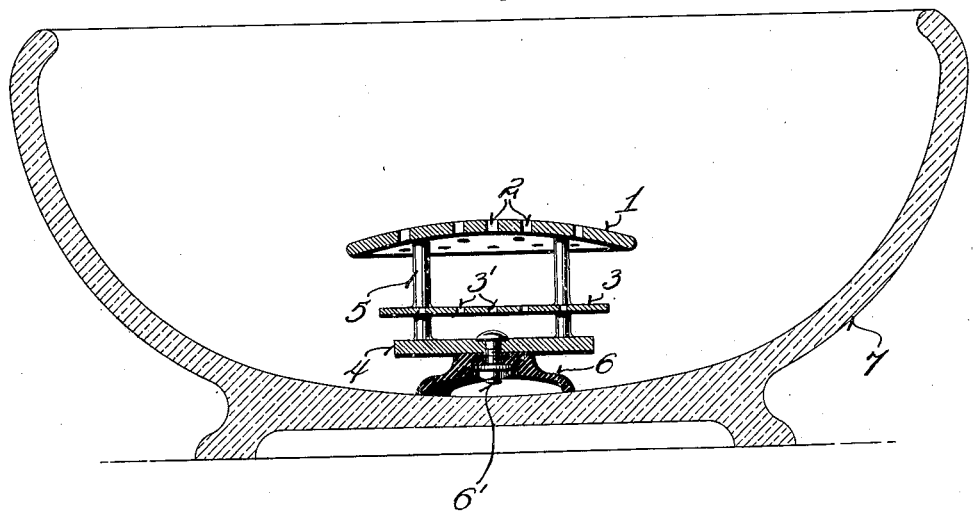
Figure 1 is a longitudinal section through a support constructed in accordance with the present invention, the same being shown in connection with a conventional structure of bowl designed to contain water.
Figure 2:
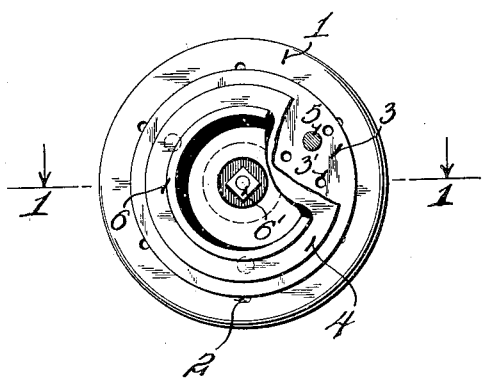
Figure 2 is a view looking at the bottom of the support with parts broken away to more clearly illustrate the structural features.

Referring now more particularly to the accompanying drawings, the present invention comprises a support consisting of a spherical or crowned top plate 1 provided with a plurality of spaced openings 2 for the reception of flower stems. Positioned below the top 1 is an intermediate plate 3 which is also provided with a plurality of spaced openings 3' adapted to cooperate with the openings 2 to firmly hold the flower stems in an upright position. Below the plate 3 the bottom member 4 is spaced therefrom to permit the stems to extend partially through the openings in the plate 3.

The top, bottom and intermediate plate are connected and held in spaced relation by means of the uprights 5, and while I prefer to cast or form the foregoing structure in one integral piece, it will be understood that the same may be assembled from separate members secured together in any suitable manner.

Detachably connected to the bottom 4 is a vacuum cup 6 which is secured to the bottom by means of the bolt 6', passing through both members, and the nut and washer threaded thereon.

As illustrated in Figure 1, the present invention is designed to be used in connection with a bowl 7 which will contain water where it is employed for displaying fresh cut flowers.

In the use of the present invention, the bowl will be partially filled with water either before or after the support is positioned therein. In either instance, a downward pressure on the support will expand the vacuum cup expelling either the air or liquid beneath it, and it is obvious that where water is contained in the bowl, the same will serve as a seal to prevent breaking of the vacuum contained under the cup. Thus, it will be seen that the support will be firmly and securely anchored in any desired position within the bowl. This is of particular advantage in instances where more than one support are used in a single bowl, as the supports may then be attached to the sides or inclined surfaces of the bowl.

It will further be appreciated that in attaching the vacuum cup to the bottom 4, and providing the intermediate plate 3, the cup is so hidden that it will not detract from the appearance of the support, and further, it will in no way interfere with the stems of the flowers, nor reduce the capacity or number of flowers to be held by the support. Furthermore, the method which I employ for attaching the cup to the standard is comparatively simple and permits ready removal or replacement of the cup when desired.

I claim:

1. A floral support having openings for the reception of flower stems, and a vacuum cup detachably connected with the bottom thereof.

2. The combination of a bowl adapted to contain water, a floral support for receiving flower stems, and a vacuum cup carried by said support whereby it may be detachably anchored at any desired position within said bowl.

3. A floral support comprising a top provided with openings for the reception of flower stems, a bottom, an intermediate plate provided with openings adapted to cooperate with the openings in the top, connecting members for holding the top, bottom, and intermediate plates in spaced relation, and a vacuum cup detachably secured to the bottom.

4. A floral support comprising a crowned top provided with a plurality of spaced openings for the reception of flower stems, a bottom, an intermediate plate provided with spaced openings adapted to cooperate with the openings in said top, a plurality of spaced upright connecting members for holding the top, bottom, and intermediate plate in spaced relation, and a vacuum cup secured to said bottom.

In testimony that I claim the foregoing I have hereunto set my hand at Milwaukee, in the county of Milwaukee and State of Wisconsin.

FREDERICK D. MacDONALD.